Patented Apr. 17, 1945

2,374,145

UNITED STATES PATENT OFFICE 2,374,145

POLYAMIDES

Guy B. Taylor, Wilmington, Del., assignor to E. I. du Pont de Nemours & Company, Wilmington, Del., a corporation of Delaware No Drawing. Application January 23, 1941, Serial No. 375,699

6 Claims. (Cl. 260—78)

This invention relates to new compositions of matter and more particularly to new and improved compositions comprising polyamides.

The polymers improved by the present process are linear polyamides obtainable by the self-polymerization of monoaminomonocarboxylic acids, and by reacting diamines with dibasic carboxylic acids in substantially equimolecular proportions.

The polyamides, particularly in the form of fibers or thin films obtained from the high molecular weight or fiber-forming polyamides which are described in U. S. Patents 2,071,253 and 2,130,948 and with which this invention is particularly concerned, tend to degrade upon continued exposure to high temperature, strong light, and to the combined action of sunlight and moisture in outdoor weathering. In ordinary textile uses the polyamide fibers are not inferior to other textile fibers but for purposes involving long exposure to the above mentioned conditions the polyamide fibers do not possess the resistance to degradation found in wool, cotton and regenerated cellulose.

This invention has as an object new and improved polyamide compositions. A further object is the production of polyamide products, particularly those in the form of fibers, bristles, films, etc. which are characterized by improved stability towards degradation under the action of heat and light. A further object is a process for obtaining the above mentioned polyamide products. A further object is the manufacture of fibers and bristles having increased retention of tenacity and resistance to cracking upon sharp bending. A still further object is the production of polyamides which are stable not only to heat and light but which are also viscosity stable in that further polymerization with undesirable viscosity increase is prevented at the temperature required for extrusion of the molten polymer. Other objects will appear hereinafter.

The above objects are accomplished by a process which comprises including with the reactants from which the polyamide is formed an aromatic compound which is stable under amide-forming conditions and which has a single amide-forming group and an oxygen or sulfur atom directly attached to the aromatic ring. By "amide-forming group" in the appended claims is meant a carboxyl group, a primary or secondary aliphatic amino group, or a primary aromatic amino group, and amide-forming derivatives thereof.

The aromatic compounds of this kind which are particularly valuable for the present purpose and which represent the best method of practicing my invention, are the aryl-oxyacetic acids and their sulfur analogs, namely, arylthioglycolic acids, the aryloxyalkylamines, and the aminophenols. Examples of such compounds are o-hydroxyphenoxyacetic acid which is outstanding as a light stabilizer for the polyamides, and arylaminophenoxyacetic acids, such as p-N-phenylaminophenoxyacetic acid which is an effective heat stabilizer, o- and p-aminophenols, and o-methoxyphenoxyethylamine.

In carrying out my invention from 0.5 to 4 molar per cent or more of the desired aromatic compound having a single amide-forming group and an oxygen or sulfur atom attached to the ring is added to the polyamide-forming composition which is usually an equimolecular mixture of diamine and dibasic acid, or more conveniently to the crystalline salt of these ingredients. A small amount of water is included in the reaction mixture to promote early mixing and a smoother reaction. The reaction is carried out and the polyamide and the fibers, films, etc. obtained according to the procedure described in U. S. Patent 2,163,636.

The invention is further illustrated by the following examples in which the parts are by weight unless otherwise stated.

*Example I*

A charge of 46.3 parts of hexamethylenediammonium adipate, 16.9 parts of water, 0.504 part of o-hydroxyphenoxyacetic acid and 0.174 part of hexamethylenediamine is placed in a reaction vessel having three openings. The air is displaced by air-free nitrogen and the charge is heated at such a rate that the internal temperature will reach 265° C. in 4 hours. When the internal pressure reaches 250 lbs. per sq. in. it is maintained at this pressure by the cautious removal of steam until the temperature reaches 265° C. The pressure is allowed to fall to atmospheric over a period of one hour. The charge is then maintained at 275° C. for a further hour, when it is forced out by nitrogen pressure as a ribbon which is quenched in water. The ribbon of polyhexamethylene adipamide containing o-hydroxyphenoxyacetic acid as a viscosity stabilizer is cut into chips, dried and spun into fibers which are oriented by stretching to 3.61 times their original length. Yarn (I) of 195 denier, obtained by this process, has a tenacity of 6.0 g. per denier, an elongation of 15%, and a knot strength of 4.6 g. per denier as determined on the inclined plane tester (Scott, Am. Dyestuff Reporter 24, 120 (1935)). Yarn (II) of 175 denier obtained from polyhexamethylene adipamide containing acetic acid as viscosity stabilizer, prepared in a similar manner, has a tenacity of 5.4 g. per denier, an elongation of 17%, and a knot strength of 4.6 g. per denier. The effect on the tenacity, elongation, and knot strength of the yarns by exposure to a carbon arc, sunlight behind glass, and outdoors for the indicated periods is shown in the table below. The data in the table show the great improvement in light stability of polyhexamethylene adipamide brought about by the use of o-hydroxyphenoxyacetic acid, as a viscosity stabilizer. The values for tenacity, elongation, and knot strength are expressed as per cent loss from the original values for the unexposed yarn.

|  | (Per cent loss of original) | | |
| --- | --- | --- | --- |
|  | Tenacity | Elongation | Knot strength |
| AFTER 264 HOURS' EXPOSURE TO CARBON ARC | | | |
| Yarn I | 13 | 7 | 11 |
| Yarn II | 85 | 88 | 100 |
| AFTER 60 DAYS IN SUNLIGHT BEHIND GLASS | | | |
| Yarn I | 10 | 7 | 20 |
| Yarn II | 59 | 53 | 63 |
| AFTER 11 WEEKS OUTDOORS IN FLORIDA | | | |
| Yarn I | 20 | 13 | 28 |
| Yarn II | 66 | 59 | 70 |

*Example II*

An interpolyamide of polyhexamethylene adipamide, polyhexamethylene sebacamide and polypentamethylene carbonamide stabilized with o-methoxyphenoxyacetic acid is prepared by the method described in Example I from a charge consisting of 200 parts of hexametylenediammonium adipate, 150 parts of hexamethylenediammonium sebacate, 150 parts of caprolactam, 3.49 parts of o-methoxyphenoxyacetic acid, 1.25 parts of hexamethylenediamine and 70 parts of water. An unoriented film of this interpolyamide does not become brittle, even after 1200 hours' exposure to a carbon arc. A similar film in which acetic acid is used as the viscosity stabilizer in place of o-methoxyphenoxyacetic acid fails, i. e. becomes embrittled, after 200 hours under similar conditions of exposure.

*Example III*

Polyhexamethylene adipamide stabilized with p-N-phenylaminophenoxyacetic acid is prepared by the method of Example I from a charge consisting of 46.3 parts of hexamethylenediammonium adipate, 16.9 parts of water, 0.643 part of p-N-phenylaminophenoxyacetic acid and 0.154 part of hexamethylenediamine. This polyamide is coated on #22 (B. & S. gauge) copper wire by melt extrusion. This coated wire shows no cracking when wound rapidly on a 0.04 inch mandrel after 137 hours' exposure in air at 150° C. Similar wire whose coating contains only acetic acid as a viscosity stabilizer shows cracks after 48 hours' exposure under identical conditions.

*Example IV*

An interpolyamide of polyhexamethylene adipamide and polypentamethylene carbonamide stabilized with p-N-phenylaminophenoxyacetic acid is prepared from 28 parts of hexamethylenediammonium adipate, 22 parts of omega-aminocaproic acid, 1.39 parts of p-N-phenylaminophenoxyacetic acid and 0.332 part of hexamethylenediamine. An unoriented film of this interpolyamide becomes brittle at 150° C. after 300 hours' exposure while a similar film of the interpolyamide containing acetic acid as viscosity stabilizer becomes brittle after but 1.5 hours' exposure under the same conditions.

*Example V*

Polyhexamethylene adipamide stabilized with p-N-phenylaminophenoxyacetic acid is prepared as described in Example II and is extruded as 25 mil monofils. After exposure of an unoriented monofil of this polyamide for 200 hours at 150° C. in air it is still possible to tie a tight overhand knot showing that embrittlement has not occurred. An attempt to tie an overhand knot in a similar monofil of polyhexamethylene adipamide containing acetic acid as viscosity stabilizer causes shattering of the monofil after 7 hours' identical exposure.

*Example VI*

Polyhexamethylene adipamide stabilized with 2-naphthylthioglycolic acid (m. p. 91–93° C.) is prepared by the method of Example I from 48 parts of hexamethylenediammonium adipate, 1.2 parts of 2-naphthylthioglycolic acid and 0.319 part of hexamethylenediamine. An unoriented film of this polyamide becomes brittle after about 8 hours at 150° C. while under identical conditions a similar film of polyhexamethylene adipamide containing acetic acid as a stabilizer becomes brittle within two hours.

*Example VII*

An unoriented film of a polyamide prepared from 48 parts of hexamethylenediammonium adipate, 1.275 parts of 5-methoxy-1-naphthoxyacetic acid (m. p. 194–6° C.) and 0.319 part of hexamethylenediamine did not become brittle on exposure at 150° C. until after 120 hours. A similar film containing acetic acid as a stabilizer becomes brittle within two hours' exposure under the same conditions.

Aromatic stabilizing compounds having an amide-forming group other than that of the above aryloxyacetic acid compounds are also useful in obtaining heat or light stable polyamides. Those compounds are preferred in which the amide-forming group or chain of atoms containing the amide-forming group is in the ortho position in relation to the oxygen or sulfur atom. Compounds having an amide-forming group include primary and secondary aliphatic amines, primary aromatic amines, carboxylic acids, esters, nitriles and acid chlorides which are capable of producing monocarbonamides by reaction with a complementary amide-forming group. Further compounds of this kind are included in the following examples.

*Example VIII*

An unoriented film of a polyamide prepared from 48 parts of hexamethylenediammonium adipate, 0.758 part of m-hydroxybenzoic acid, and 0.319 part of hexamethylenediamine becomes brittle only after 400 hours' exposure to a carbon arc. A similar film containing acetic acid as a stabilizer becomes brittle within 200 hours.

Example IX

Polyhexamethylene adipamide stabilized with o-methoxyphenoxyethylamine (b. p. 110° C. at 2 mm.) is prepared from 48 parts of hexamethylenediammonium adipate and 1.319 parts of o-methoxyphenoxyethylammonium adipate, m. p. 109–111° C. Unoriented films of this polyamide do not become brittle even after 1200 hours' exposure to a carbon arc while similar films containing acetic acid as a viscosity stabilizer become brittle in less than 200 hours. In exposures to air at 150° C., films of polyhexamethylene adipamide stabilized with o-methoxyphenoxyethylamine become brittle only after 50 hours, while films of polyhexamethylene adipamide containing acetic acid as viscosity stabilizer become brittle within 2 hours' exposure under the same conditions.

Example X

An unoriented film of the polyamide prepared from 48 parts of hexamethylenediammonium adipate, 0.841 part of 2,5-dimethoxyaniline and 0.401 part of adipic acid becomes brittle on exposure at 150° C. only after 20 hours.

Example XI

An unoriented film of polyamide prepared from 48 parts of hexamethylenediammonium adipate, 1.758 parts of phenolphthalin and 0.319 part of hexamethylenediamine did not become brittle on exposure at 150° C. until after 50 hours. On exposure to a carbon arc, a film of polyhexamethylene adipamide viscosity stabilized with phenolphthalin did not become brittle until after 400 hours, while a similar film of polyhexamethylene adipamide stabilized with acetic acid becomes brittle within 200 hours.

Example XII

Films of a polyamide prepared from 48 parts of hexamethylenediammonium adipate, 0.599 part of p-aminophenol and 0.401 part of adipic acid become brittle within 28 hours on exposure to air at 150° C. and within 300 hours on exposure to a carbon arc. Films of a similar polyamide containing acetic acid as the stabilizer become brittle within 2 hours and 200 hours, respectively, under similar conditions of exposure.

As previously pointed out the compounds used in the practice of this invention are those which are stable under polyamide-forming conditions, that is, at temperatures above 175° C. and in the presence of water during the entire preparation of the polyamide. Syringic acid, for instance, is unsuitable for the present purpose since it decomposes at the temperature of amide formation into carbon dioxide and 2,6-dimethoxyphenol, the latter compound acting as an antioxidant to protect the molten polymer.

The stabilizing compounds described herein are reacted with the ingredients which form the polyamide and cannot be removed from the polyamides by volatilization or by solvent extraction. They are ineffective for the present purpose when incorporated into the preformed polyamide.

Compounds in addition to those mentioned which are valuable heat and light stabilizers for polyamides include phenoxyacetic acid, phenylthioglycolic acid, 2,4-dimethylphenoxyacetic acid, 1-naphthoxyacetic acid, 2-naphthoxyacetic acid, m-hydroxyphenoxyacetic acid, p-hydroxyphenoxyacetic acid, p-mercaptophenylacetic acid, o-methoxyphenoxyacetic acid, p-benzyloxyphenoxyacetic acid, 2,6-dimethoxyphenoxyacetic acid, p-N-2-naphthylaminophenoxyacetic acid, and p-N-(p'-ethoxyphenyl)-aminophenoxyacetic acid. Further compounds are gamma-p-hydroxyphenylbutyric acid, 2,4-dimethylphenoxyethylamine, bis-(o-methoxyphenoxyethyl)amine, phenylthioethylamine, o-anisidine, p-phenetidine, tyramine (beta-p-hydroxyphenylethylamine), 3,4-dimethoxybenzylamine, o-aminophenol, and N-ethyl-o-aminocresol.

The heat and light stabilizers of this invention also function as viscosity stabilizers to a degree which in many instances surpasses or at least equals that of materials such as acetic acid or butylamine, which are known to be useful viscosity stabilizing agents but which do not impart any substantial resistance to the degradative action of heat and light. These known viscosity stabilizing agents are, however, in some instances advantageously used in conjunction with the heat and light stabilizing compounds of this invention.

Polyamides useful in the practice of this invention are obtained from the reactants described in the previously identified patents. It is to be understood that the mention herein of the amino acids, dibasic acids, and amines includes such amide-forming derivatives as the carbamate and the N-formyl and N,N'-diformyl derivatives in the case of the diamine and in the case of the acids the corresponding esters, anhydrides, amides, acid halides, carbamates, N-formyl derivatives, and in the presence of water, the nitriles, cyanocarboxylic acids, cyanoamides, and cyclic amides.

These linear polyamides include also polymers obtained by admixture of other linear polymer-forming reactants, as for instance, glycols, monoaminomonohydric alcohols or monohydroxymonocarboxylic acids in the case of polyester-amides, with the mentioned polyamide-forming reactants. In either instance the amide group is an integral part of the main chain of atoms in the polymer and, in the case of the preferred fiber-forming polyamides, the average number of atoms separating the amide groups is at least two.

By means of this invention polyamide products are obtained which, as compared to polyamide containing the usual viscosity stabilizers, have markedly increased resistance to heat, light, and outdoor weathering. These properties are particularly valuable in the case of the oriented polyamide fibers which exhibit increased retention of tenacity, elongation, and knot strength. Unoriented and oriented films of the modified polyamides show a much greater resistance to cracking when bent sharply through a 180° angle after exposure than do corresponding films of ordinary polyamides. Similar increased resistance to cracking after exposure at high temperatures is shown by wire coated with the polyamides containing the present substituted aromatic compounds. Likewise, filaments in the form of fibers and bristles made from polyamides containing these compounds possess higher tenacities and a greater fatigue resistance after exposure than bristles made from ordinary polyamides.

In addition to the production of improved fibers, bristles and films, this invention is useful in connection with various other forms to which the polyamides are suited, as for instance in molded articles, coating compositions, coatings for fabrics, and metal articles and for wires in electrical insulation.

As many apparently widely different embodiments of this invention may be made without departing from the spirit and scope thereof, it is to be understood that I do not limit myself to the specific embodiments thereof except as defined in the appended claims.

I claim:

1. A synthetic linear polyamide having improved resistance to degradation and comprising the reaction product of a polyamide-forming composition and from 0.5 to 4 mols per cent of an aromatic compound which is stable at polyamide-forming temperatures in the presence of water, which is selected from the group consisting of aryloxyacetic acids and their sulfur analogs, aminophenols, and arloxyalkylamines, and which has a single amide-forming group and an atom of the class consisting of oxygen and sulfur directly attached to the aromatic ring, said polyamide-forming composition comprising reacting materials selected from the class consisting of (a) polymerizable monoaminomonocarboxylic acid and (b) mixture of diamine and dibasic carboxylic acid, said single amide-forming group being selected from the class consisting of carboxyl groups, primary amino groups, and secondary amino groups wherein the nitrogen of the secondary amino group is attached to an aliphatic carbon atom.

2. A filament comprising a synthetic linear polyamide, said polyamide being the reaction product of a polyamide-forming composition and from 0.5 to 4 mols per cent of an aromatic compound which is stable at polyamide-forming temperatures in the presence of water, which is selected from the group consisting of aryloxyacetic acids and their sulfur analogs, aminophenols, and aryloxyalkylamines, and which has a single amide-forming group and an atom of the class consisting of oxygen and sulfur directly attached to the aromatic ring, said polyamide-forming composition comprising reacting materials selected from the class consisting of (a) polymerizable monoaminomonocarboxylic acid and (b) mixture of diamine and dibasic carboxylic acid, said single amide-forming group being selected from the class consisting of carboxyl groups, primary amino groups, and secondary amino groups wherein the nitrogen of the secondary amino group is attached to an aliphatic carbon atom.

3. A film comprising a synthetic linear polyamide, said polyamide being the reaction product of a polyamide-forming composition and from 0.5 to 4 mols per cent of an aromatic compound which is stable at polyamide-forming temperatures in the presence of water, which is selected from the group consisting of aryloxyacetic acids and their sulfur analogs, aminophenols, and aryloxyalkylamines, and which has a single amide-forming group and an atom of the class consisting of oxygen and sulfur directly attached to the aromatic ring, said polyamide-forming composition comprising reacting materials selected from the class consisting of (a) polymerizable monoaminomonocarboxylic acid and (b) mixture of diamine and dibasic carboxylic acid, said single amide-forming group being selected from the class consisting of carboxyl groups, primary amino groups, and secondary amino groups wherein the nitrogen of the secondary amino group is attached to an aliphatic carbon atom.

4. A process for making polyamides which comprises reacting at polyamide-forming temperatures a polyamide-forming composition and from 0.5 to 4 mols per cent of an aromatic compound which is stable at said temperature, which is selected from the group consisting of aryloxyacetic acids and their sulfur analogs, aminophenols, and aryloxyalkylamines, and which has a single amide-forming group and an atom of the classs consisting of oxygen and sulfur directly attached to the aromatic ring, said polyamide-forming composition comprising reacting materials selected from the class consisting of (a) polymerizable monoaminomonocarboxylic acid and (b) mixture of diamine and dibasic carboxylic acid, said single amide-forming group being selected from the class consisting of carboxyl groups, primary amino groups, and secondary amino groups wherein the nitrogen of the secondary amino group is attached to an aliphatic carbon atom.

5. The polyamide defined in claim 1 in which said polyamide-forming composition comprises a diamine and a dicarboxylic acid.

6. The polyamide defined in claim 1 in which said polyamide-forming composition comprises a monoaminomonocarboxylic acid.

GUY B. TAYLOR.